No. 613,060. Patented Oct. 25, 1898.
W. CORLISS.
WHEEL TIRE.
(Application filed Dec. 23, 1896.)
(No Model.)
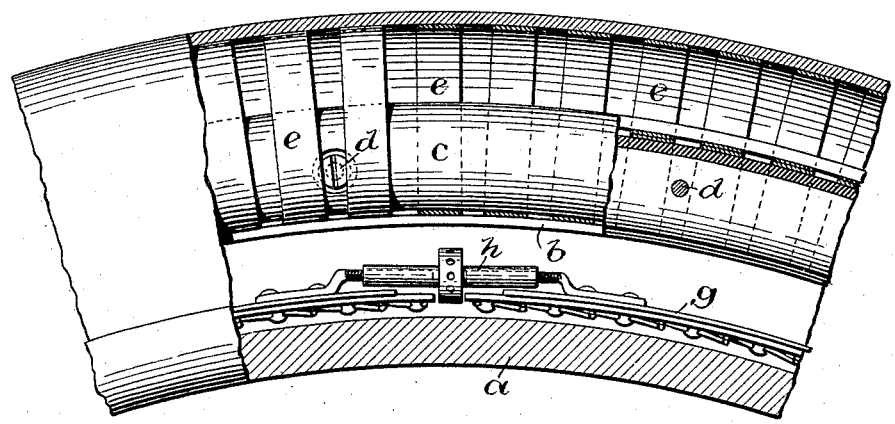
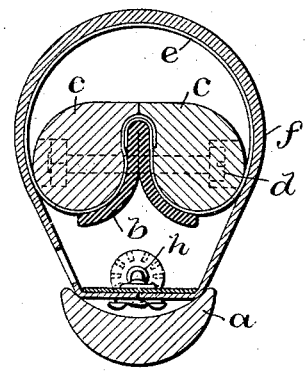 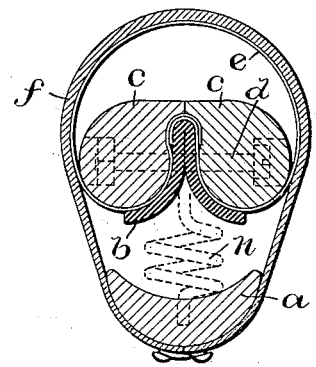
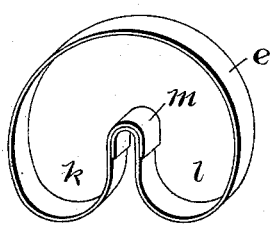 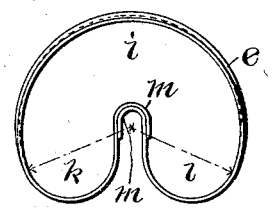 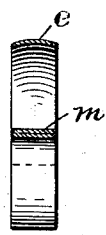
WITNESSES:
M. F. Bligh
Chas. H. Luther Jr.
INVENTOR:
William Corliss,
by Joseph A. Miller & Co.,
Attys.
THE NORRIS PETERS CO., PHOTO-LITHO., WASHINGTON, D. C.

UNITED STATES PATENT OFFICE.

WILLIAM CORLISS, OF PROVIDENCE, RHODE ISLAND.

WHEEL-TIRE.

SPECIFICATION forming part of Letters Patent No. 613,060, dated October 25, 1898.

Application filed December 23, 1896. Serial No. 616,716. (No model.)

*To all whom it may concern:*

Be it known that I, WILLIAM CORLISS, of Providence, in the county of Providence and State of Rhode Island, have invented a new and useful Improvement in Wheel-Tires; and I hereby declare that the following is a full, clear, and exact description of the same, reference being had to the accompanying drawings, forming part of this specification.
Tires such as are used on bicycles and other wheels are designed to give an elastic support to the vehicle by interposing the elastic medium between the rim of the wheel and the road. As heretofore constructed they may be divided into two classes—viz., the pneumatic tires and the spring-tires.

The pneumatic tires, while they form an easy elastic cushion between the wheel-rim and the road, are liable to be punctured by any sharp object on the road and become useless, because the air contained in the tire under pressure quickly escapes and the tire collapses.

Various devices have been used to protect the pneumatic tire against being punctured. One of these consists in a metal ring placed within the pneumatic tire and bearing on the inside of the tread of the tire. Such a metal ring prevents the entering of a pointed object into the tire and the escape of the air; but it destroys the capacity of the pneumatic tire to yield locally to the small pebbles, stones, and other objects on the road to which the pneumatic tire locally yielded.
The spring-tire, made up of a series of metal springs, supports the wheel and the load at the one point on the wheel or wheels between the wheel-rim and the road, and as every point on the tread of the tire in rotating becomes successively this point of support each point or every inch of the wheel-tire requires a spring strong enough to support the wheel and its load. To make a spring-tire practically useful, the springs had to be so strong and heavy that for bicycles and similar vehicles they were useless.

The object of this invention is to produce a wheel-tire the tread of which will yield readily to any small irregularities of the road or objects on the road, so as to avoid the tremor incident to bicycles and similar vehicles on macadam, gravel, and similar roads and in which the load is supported on a number of the springs bearing on the tread of the tire.

The invention consists in a tire formed of a ring practically disconnected from the wheel-rim and of larger diameter than the wheel-rim, said ring provided with a series of springs, and an envelop inclosing the ring and springs and secured to the wheel-rim, whereby the series of independent springs at the tread may yield to irregularities of or on the road and the load is supported by the envelop secured to the wheel-rim and bearing on the springs on the upper part of the ring, thus supporting the vehicle and load from above on about one-third of all the springs in the tire.

Figure 1 is a view of part of my improved wheel-tire secured to the wheel-rim, partly in section. Fig. 2 is a transverse section showing my improved wheel-tire secured to the wheel-rim. Fig. 3 is a transverse section of the wheel rim and tire, indicating in broken lines the use of springs interposed between the wheel-rim and the spring-bearing ring. Fig. 4 is a perspective view of one of the series of springs. Fig. 5 is a side view, and Fig. 6 a transverse sectional view, of the spring.

Similar letters of reference indicate corresponding parts in all the figures.

In the drawings I have shown and I will describe what I now consider to be the preferred manner of carrying out my invention in practical use; but I do not wish to confine myself to the exact form and construction shown, as the same may be varied in some of the details without departing from the spirit of the invention, believing as I do that I am the first to construct a wheel-tire the tread of which may readily yield locally to irregularities of or on the road and by which the wheel and load are supported by an extended portion of the tire from above, and am also the first to construct a tire in which a ring provided with a series of springs to support the tread of the tire is connected by an envelop to the wheel-rim, but otherwise disconnected from and independent of the same.

In the drawings, *a* indicates the wheel-rim. It is shown in the drawings in the form used on bicycles, but may be of any other suitable form. The ring *b* is shown in Figs. 2 and 3 as formed of sheet metal. It is a complete ring, the inner diameter of which is greater than the largest diameter of the wheel-rim *a*, so that in the normal position the ring *b* may be placed concentric with and at some distance from the wheel-rim.

*c c* are two bolsters, preferably made of wood bent to form two rings; but they may be formed in sections. They are bolted together and to the ring *b* by the bolts *d d*. The springs *e e* are clamped between the ring *b* and the bolsters *c c* and placed at such intervals that the spaces between the independent springs *e e* are preferably less than the width of the springs.

The envelop *f* is made of some suitable flexible material, preferably non-elastic in the sense that while rubber is elastic canvas and leather are non-elastic. The envelop *f* surrounds the springs *e* and is secured to the rim *a* of the wheel in any practical manner heretofore used to secure the tires to the rims of wheels. Two methods are shown in the drawings in Figs. 1 and 2. The opposite ends of the plate *g* are secured together by the right and left hand screw-threaded sleeve *h* and are contracted in diameter like a hoop, and thus bind the envelop *f* to the wheel-rim *a*, and in Fig. 3 the envelop is shown laced to the wheel-rim, so as to inclose the same.

The preferred form of the springs *e e* is shown in Figs. 4, 5, and 6. They are bent up from a strip of spring-steel to form the larger upper arch *i*, the two smaller inverted arches *k l*, and the overlapping ends *m m*. In the preferred form the portion forming the upper arch *i* is made slightly convex in cross-section, as is shown in Figs. 5 and 6.

Although the envelop *f* when properly secured to the wheel-rim will hold the ring *b* in the concentric position, suitable springs may be interposed between the wheel-rim and the ring, as is indicated in broken lines in Fig. 3.

The operation of the tire in connection with a wheel differs materially from the operation of tires as heretofore constructed. When the ring with its springs, forming, as they do, a complete spring-tire the inner diameter of which is greater than the outer diameter of the wheel-rim, is firmly secured by the flexible envelop to the wheel-rim, the ring is supported and held concentric with and equidistant from the wheel-rim. When such a wheel is set up on its periphery, as in a vehicle, the wheel is suspended from the upper part of nearly one-half of the tire, and no matter what load is placed on the wheel the wheel will be always suspended from the upper part of the ring-tire, and the large number of springs acted on by the envelop will support any reasonable weight placed on the wheel or the vehicle, yet the spring *e*, two contiguous springs, or possibly three or even four springs at any time in contact with the road or floor will readily yield and adapt themselves to the road or any inequality in or on the road.

The springs may therefore be comparatively light, so that the tread of the tire will readily yield to obstructions or inequalities, and yet a very heavy load will be easily supported from the upper part of the tire by the coaction of a large number of springs.

When such a heavy load is to be carried as would compress or be liable to compress the spring or springs *e* on the lower part of the tire on the road to their limit, so as to touch the bolsters *c c*, then the springs *n*, such as are indicated in broken lines in Fig. 3, may be placed between the wheel-rim and the ring *b*.

When my improved wheel-tire is used on a vehicle, the load is not carried by the wheel, but is suspended from the springs of the upper part of the tire, forming about one-third of the whole length of the tire, and this is, as far as I know, the first time that the load of a vehicle has been thus yieldingly suspended.

Having thus described my invention, I claim as new and desire to secure by Letters Patent—

1. In a wheel-tire, the combination of the following instrumentalities, viz: a wheel-rim, an envelop secured to the wheel-rim and forming the tread of the tire, a ring of larger diameter than the wheel-rim, and a series of springs interposed between the ring and the envelop at the tread of the tire, whereby the load is supported by the ring and tire, cushioned by the springs carried by the ring, as described.

2. A wheel-tire consisting of a ring, a series of independent springs supported on the ring, an envelop inclosing the springs and the ring, and means, substantially as described, for securing the envelop to a wheel-rim, as described.

3. A spring for a wheel-tire bent up from a strip of sheet metal having the upper arch *i*, the inverted arches *k l* and the overlapping ends *m m*, the central portion of the arch *i* being preferably slightly convex, whereby the springs may be supported on the ring *b*, as described.

4. In a wheel-tire, the combination with the wheel-rim *a* and the envelop *f* secured to the wheel-rim, of the ring *b*, the series of independent springs *e e* and means for securing the springs to the ring; whereby the wheel is supported from the upper part of the ring and the tread of the tire is cushioned by the springs, as described.

5. In a wheel-tire, the combination with the ring *b* and the series of springs *e e*, of the bolsters *c c*, whereby the compression of the springs is limited, as described.

6. In a wheel-tire, the combination with the wheel-rim and an envelop secured to the wheel-rim and forming the tread of the tire, of the series of independent springs *e e*, the bolsters *c c* forming, when secured together, a continuous ring of larger diameter than the wheel-rim, and means, substantially as described, for securing the springs to the bolsters to form in connection with the bolsters the support for the wheel, as described.

7. In a wheel-tire, the combination with the ring $b$, the bolsters $c\ c$ and the bolts $d\ d$, of the series of springs $e\ e$; the whole forming a continuous elastic support for the tread of the tire, as described.

8. In a wheel-tire, the combination with the wheel-rim $a$, the envelop $f$, and the band $g$, the ends of which are adjustably connected together by the right and left screw-threaded sleeve $h$, of the ring $b$, the series of independent springs $e\ e$ supported on the ring, the bolsters $c\ c$ and the bolts $d\ d$; the whole forming a cushioned tire, whereby the wheel and load are supported from the upper part of the tire and the tread of the tire may yield to inequalities in or on the road, as described.

In witness whereof I have hereunto set my hand.

WILLIAM CORLISS.

Witnesses:
M. F. BLIGH,
JOSEPH A. MILLER, Jr.